United States Patent
Glicklich et al.

(10) Patent No.: US 8,010,964 B2
(45) Date of Patent: Aug. 30, 2011

(54) METHODS FOR MONITORING AND MANAGING PROCESSES

(75) Inventors: Barry J. Glicklich, Warrenville, IL (US); Scott R. Kurek, Cortland, IL (US); Kevin L. Stern, Woodridge, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1671 days.

(21) Appl. No.: 11/292,439

(22) Filed: Dec. 1, 2005

(65) Prior Publication Data

US 2007/0043855 A1 Feb. 22, 2007

Related U.S. Application Data

(60) Provisional application No. 60/709,935, filed on Aug. 18, 2005.

(51) Int. Cl.
*G06F 9/46* (2006.01)
*G06F 15/173* (2006.01)
*G06F 9/00* (2006.01)
*G06F 7/04* (2006.01)

(52) U.S. Cl. .......... 718/100; 709/224; 713/1; 726/4

(58) Field of Classification Search .......... 718/100, 718/101; 714/39; 726/4, 6, 9; 709/224
See application file for complete search history.

(56) References Cited

U.S. PATENT DOCUMENTS

| | | | | |
|---|---|---|---|---|
| 5,809,230 A * | 9/1998 | Pereira | | 726/35 |
| 5,859,978 A * | 1/1999 | Sonderegger et al. | | 709/226 |
| 5,951,682 A * | 9/1999 | Clark et al. | | 713/1 |
| 6,044,445 A * | 3/2000 | Tsuda et al. | | 711/163 |
| 6,112,237 A * | 8/2000 | Donaldson et al. | | 709/224 |
| 6,377,971 B1 * | 4/2002 | Madden et al. | | 718/108 |
| 6,457,063 B1 * | 9/2002 | Chintalapati et al. | | 719/317 |
| 7,065,784 B2 * | 6/2006 | Hopmann et al. | | 726/4 |
| 7,146,635 B2 * | 12/2006 | Eggebraaten et al. | | 726/4 |
| 7,197,431 B2 * | 3/2007 | Barritz | | 702/186 |
| 7,275,150 B2 * | 9/2007 | Pagan | | 713/1 |
| 7,313,827 B2 * | 12/2007 | Kelley et al. | | 726/28 |
| 7,577,995 B2 * | 8/2009 | Chebolu et al. | | 726/26 |
| 7,669,059 B2 * | 2/2010 | Brent | | 713/188 |

(Continued)

OTHER PUBLICATIONS

"Supervisor" at www.plope.com/software/supervisor, Nov. 25, 2004.

(Continued)

*Primary Examiner* — Meng An
*Assistant Examiner* — Tammy Lee
(74) *Attorney, Agent, or Firm* — The Small Patent Law Group LLC; Dean Small; Phillip A. Shipley

(57) ABSTRACT

Systems and methods are provided for managing process execution within an operating system. The systems and method store a process initialization file, preparing a process list of processes that can be controlled by an individual user, and monitoring execution of the processes based on the process list for each user. The process initialization file is managed by a user with a first level of access to the operating system, and indicates which processes may have process execution controlled by users of the system having a different second level of access to the operating system. A process list is prepared for each individual user having the second level of access.

23 Claims, 7 Drawing Sheets

U.S. PATENT DOCUMENTS

| | | | |
|---|---|---|---|
| 7,756,835 B2 * | 7/2010 | Pugh | 707/667 |
| 2002/0083183 A1 * | 6/2002 | Pujare et al. | 709/231 |
| 2002/0112150 A1 * | 8/2002 | Lawing et al. | 713/1 |
| 2002/0178382 A1 * | 11/2002 | Mukai et al. | 713/201 |
| 2002/0184295 A1 * | 12/2002 | Bartley | 709/107 |
| 2003/0110416 A1 * | 6/2003 | Morrison et al. | 714/39 |
| 2006/0053215 A1 * | 3/2006 | Sharma | 709/223 |
| 2008/0256606 A1 * | 10/2008 | Koikara et al. | 726/4 |
| 2009/0217377 A1 * | 8/2009 | Arbaugh et al. | 726/23 |

OTHER PUBLICATIONS

"Automatically restarting server processes" at publib.boulder.ibm.com/infocenter/wasinfo/v5rl//indes.jsp?topic=/com.ibm.websphere.nd.doc/info/ae/ae/tins service.html, Jun. 3, 2005.

"Galaxy Communicator Tutorial: How to Use the PRocess Monitor" at communicator.sourceforge.net/sites/MITRE/distributions/GalaxyCommunicator/contrib/MITRE/tools/docs/process monitor tut.html, Aug. 6, 2002.

* cited by examiner

`<psmon>:<start exec>:<stop exec>:<control file>:<start time>:<stop time>:<run level>:<user>:<options>`

Fig. 6

| UID | PID | PPID | CLS | PRI | STIME | TTY | TIME | CMD |
|---|---|---|---|---|---|---|---|---|
| root | 8279 | 8255 | TS | 59 | 10:42:47 | pts/42 | 0:00 | ps -cf |
| user | 8255 | 8253 | TS | 49 | 10:28:41 | pts/42 | 0:00 | -ksh |

Fig. 7

METHODS FOR MONITORING AND MANAGING PROCESSES

CROSS REFERENCE TO RELATED APPLICATIONS

This application claims priority to U.S. Provisional Application Ser. No. 60/709,935, filed Aug. 18, 2005, which is hereby incorporated by reference in its entirety.

BACKGROUND OF THE INVENTION

This invention relates generally to the running of user processes in a computing environment, and more specifically, to methods for monitoring and managing processes.

Unix is a computer operating system originally developed in the 1960s and 1970s that was designed to be portable, multi-tasking and multi-user. The Solaris Operating System is a computer operating system developed by Sun Microsystems and certified as a version of Unix. Solaris includes a graphical user environment, ONC+, plus networking and other enhancements. Linux is a computer operating system and its associated kernel. Unlike some known proprietary operating systems, all of its underlying source code is available to the public and anyone can freely use, modify, and redistribute it. In the narrowest sense, the term Linux refers to the Linux kernel, but it is commonly used to describe entire Unix-like operating systems (also known as GNU/Linux) that are based on the Linux kernel combined with libraries and tools from the GNU Project and other sources. A "Unix-like" operating system is one that behaves in a manner similar to a Unix system, while not necessarily conforming to or being certified to any version of the single UNIX Specification. The term "Unix-like" may include free software/open source operating systems inspired by Unix or designed to emulate its features, commercial and proprietary work-a-likes, and even versions based on the licensed Unix source code (which may be deemed so "Unix-like" that they are certified to bear the "UNIX" trademark).

Multi-tasking, multi-user operating systems (such as Unix, Solaris, Linux and Unix-like operating systems) (hereinafter collectively referred to as "Unix Systems") typically have varying levels of user access. Two typical user levels of access employed by such multi-tasking, multi-user operating systems are root-level access (or superuser or system administrator) (hereinafter referred to as "root-level access") and user-level access. A user who has root-level access can perform system administration functions and do many things that a user having user-level access cannot, such as changing the ownership attributes of files and controlling execution of certain applications resident within the system.

One of the privileges that a user with root-level access typically has is to request that a process be automatically started (or restarted) in the event of failure in the execution of the process and upon initialization (or restart) of the operating system. In Unix systems, this can be accomplished by specifying in an initialization file the particular processes to be restarted and the circumstances under which they should be started (or restarted).

However, for certain processes (e.g., applications), it may be desired that this privilege be given to users with user-level access. Existing methods do not provide a way for users with user-level access to manage initialization and execution of processes. Root-level access is intended for a system administrator because of the powerful privileges bestowed upon a user with root-level access. There are existing methods that attempt to provide to a user with user-level access the ability to manage processes. One existing method to manage processes by a user with user-level access is provide instructions to the operating system in the form of a script which includes a running loop that restarts a process upon a certain event (such as termination of the process). However, if the script is terminated for some reason, the script will not ensure that a process always restarts. Another existing method available to a user with user-level access is to set-up an instruction file for the operating system (such as a crontab file in Unix Systems) to restart a process on a periodic basis.

Cron is a Unix and Solaris utility that allows tasks to be automatically run in the background at regular intervals by the cron daemon. These tasks are often termed as cron jobs in Unix and Solaris. Crontab (CRON TABle) is a file which contains the schedule of cron entries to be run and at specified times. However, this method will only cause the restart of a process at a certain time, as indicated in the instructions, and so this method will not always cover the case where the operating system restarts and a process needs to be restarted immediately afterward.

BRIEF DESCRIPTION OF THE INVENTION

A method is provided for managing control over process execution within an operating system. First and second levels of access to the operating system are defined, where the first level has more privileges associated therewith as compared to the second level. The method includes storing a process initialization file, identifying processes, for which process execution is controlled by users having the second level of access to the system. The method further includes preparing a process list identifying each user having the second level of access that affords the user control over execution of the process and monitoring execution of the processes based on the process list.

A computer system is provided that includes a memory and processor therein for managing processes that might be executed by an operating system of the computer system. The computer system includes a process initialization file, a user-level process list, and a user-level process monitor. The process initialization file is accessible by users of the system having a first level of access and indicates which processes may have process execution controlled by individual users of the system having a second level of access to the system. The user-level process list includes data relating to processes that can be controlled by each individual user of the system having the second level of access. The user-level process monitor monitors execution of the processes based on the user-level process list.

A method is provided for managing execution of a plurality of processes within a system. The method includes accessing an entry in a user-level process list, the entry associated with one of the plurality of processes, and determining a status of the process associated with the entry in the user-level process list. Upon determination of the status an execution of the process represented by the entry in the user-level process list based on the determination is adjusted. The steps of the method are repeated for all processes in the user-level process list.

BRIEF DESCRIPTION OF THE DRAWINGS

FIG. 1b is a processing diagram illustrating an initialization file and a user-level process list which may be modified by an authorized user of the system of FIG. 1a.

FIG. 6 is an example initialization file.

FIG. 7 is an example user-level process list.

DETAILED DESCRIPTION OF THE INVENTION

Exemplary embodiments provide methods and systems that are flexible, secure and permit a user with user-level access to start, restart, or terminate a process, on a periodic basis or upon the occurrence of an event. For example, the process may start upon restart of the operating system, due to, for example, a reboot of the host machine running the operating system, a user invoked restart of the operating system or an operating system crash. The amount of control given to a user with user-level access can be limited for specific applications and/or the user's needs. The systems and methods permit a user with user-level access to have a small sub-set of privileges which are typically bestowed upon a user with root-level access. Exemplary embodiments can be applied to multi-tasking, multi-user operating systems such as Unix, Solaris, Linux, Unix-like and Microsoft operating systems (hereinafter collectively referred to as "Operations Systems").

Figure 1A:
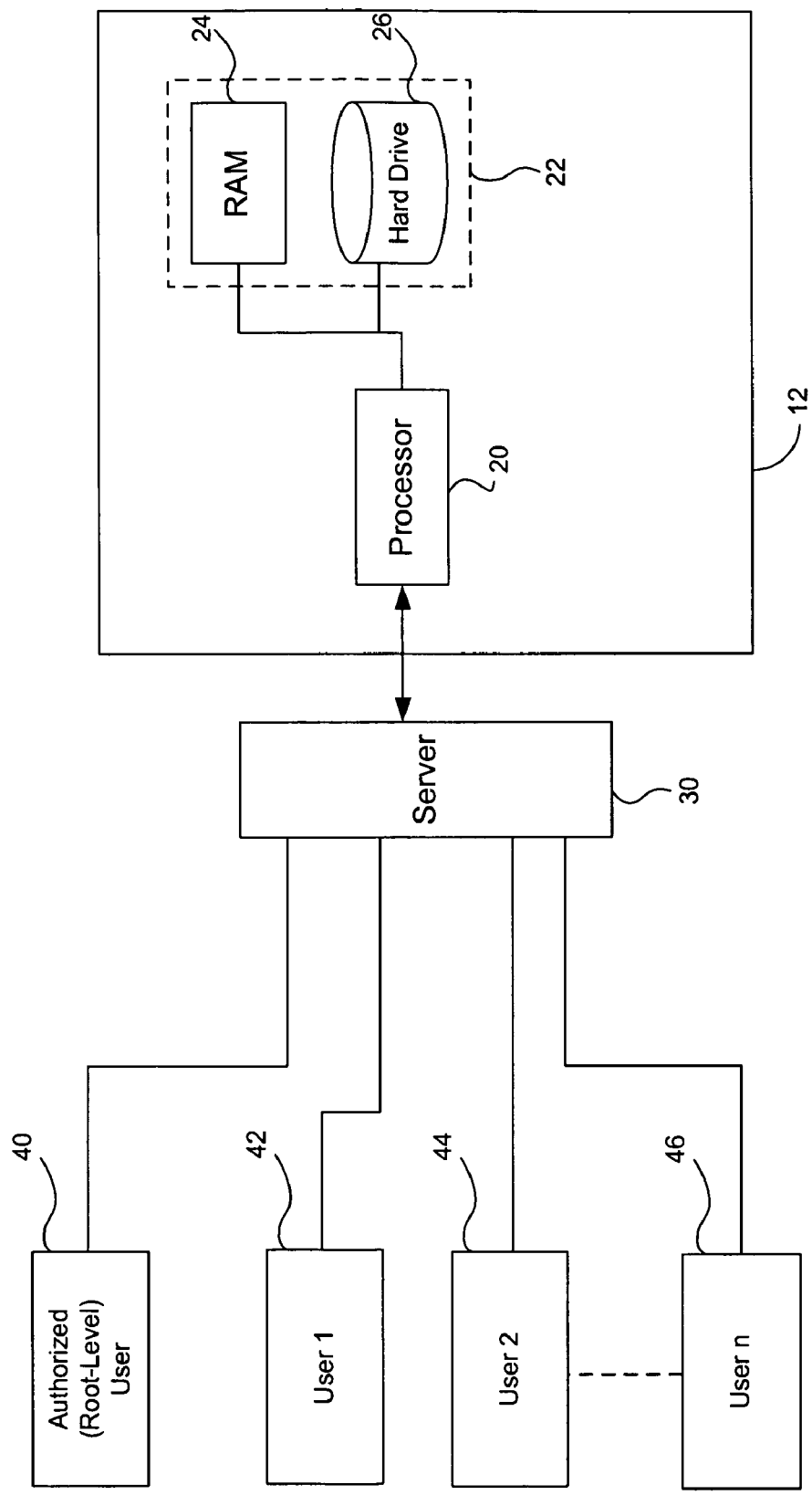
FIG. 1a is a block diagram of a system for monitoring and managing a process in accordance with one embodiment.

FIG. 1a is a block diagram of one embodiment of a System 10. System 10 includes a processing unit 12 having at least a processor 20 and a memory 22. In the embodiment illustrated, the memory 22 includes random access memory 24 and non-volatile memory, for example, hard drive 26. It is to be understood that other types of storage units may be additionally or alternatively incorporated into the memory 22. The processor 20 and thus processing unit 12 may be accessed by a number of users. In the embodiment illustrated, a server 30 is utilized to interface the processing unit 12 to computers or terminals of a number of users. Specifically, an authorized (or root-level) user 40 as well as a number of user-level users 43, 44, and 46 are illustrated as being communicatively coupled to the server 30. The system 10 is just one example of a multi-user system where the users may have varying levels of access. Also, alternative embodiments of system 10 may include various numbers of authorized users and various numbers of user-level users.

Various embodiments of system 10 utilize the above listed operating systems. For example, for those embodiments of system 10 that utilize Unix operating systems, such systems are characterized by various concepts, for example, plain text files, a command line interpreter, a hierarchical file system, and treating devices and certain types of inter-process communication as files. For Solaris operating system embodiments of system 10, a common code base for the architectures is used, for example, SPARC, x86 and x86-64. The Solaris operating system has also been ported to the PowerPC architecture and is well-suited to supporting a large number of CPUs.

For embodiments of system 10 utilizing the Linux operating system and its associated kernel, large quantities of application software are typically bundled with the core system to provide more user-friendly installation and upgrades. While, Linux was originally developed for Intel 386 microprocessors, it now supports most popular computer architectures as well as several obscure computer architectures.

Referring to the kernel of an operating system, it is the core of an operating system and includes software responsible for providing secure access to the computer hardware of system 10 and to various computer processes, for example, a computer program in a state of execution. Since there are many computer programs, and since hardware access is limited, the kernel also decides when and how long a program should be able to make use of a relevant portion of the computer hardware, which is sometimes referred to as scheduling.

Other embodiments of system 10 may utilize Unix-like operating systems. While there is no formal standard for defining the term, "Unix-like", and some difference of opinion is possible as to whether a certain operating system is "Unix-like" or not.

Figure 1B:
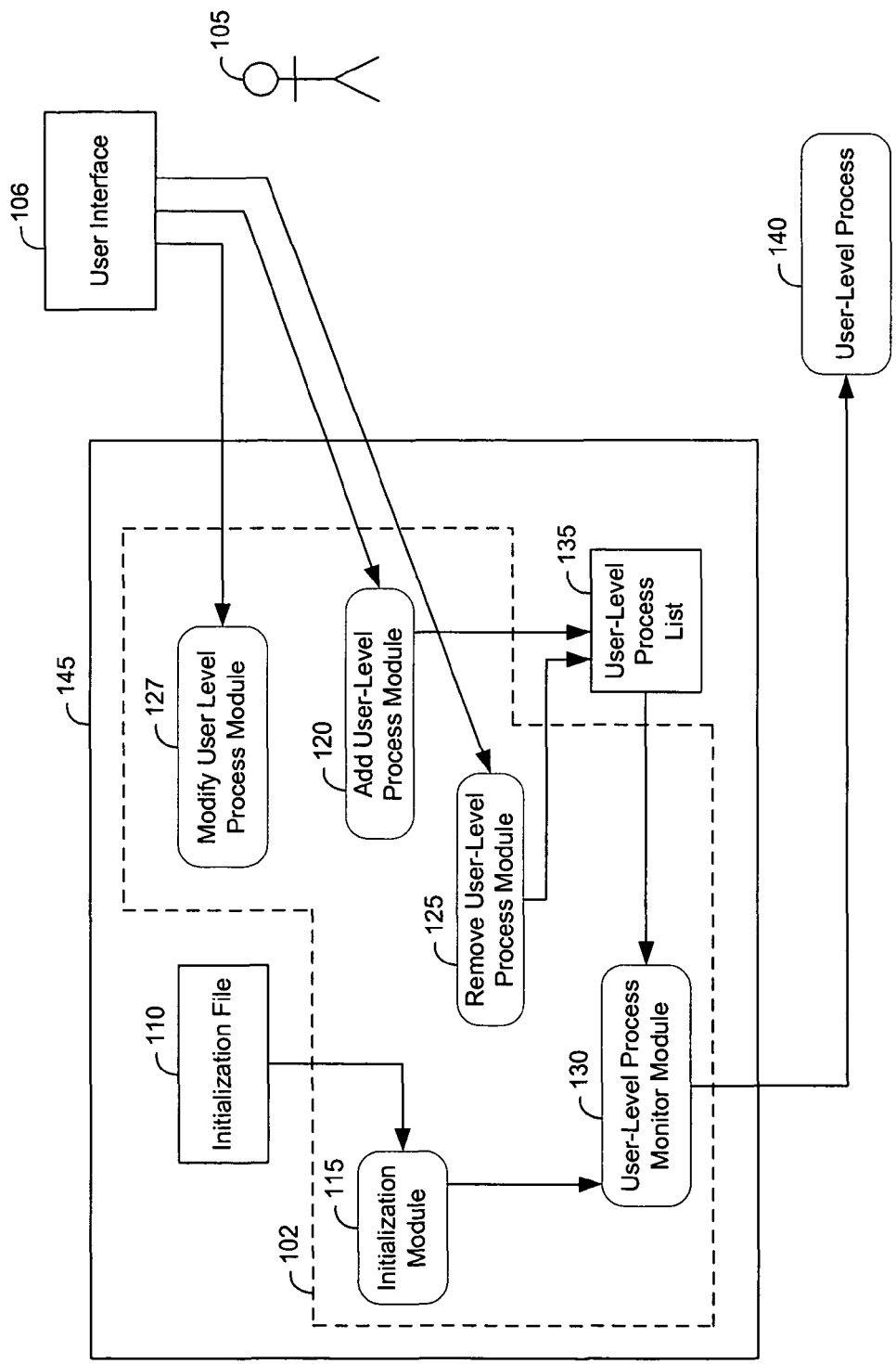

FIG. 1b is one embodiment of a processing diagram 100. Modules, lists, and files within processing diagram 100 may be implemented in the memory 22 of system 10 (shown in FIG. 1a). Processing diagram 100 includes an Initialization Module 115 which utilizes input data received from an Initialization File 110. The processing diagram 100 includes a processing module 102 which is stored in the memory 22. The processing module 102 performs, among other things, the functions of modules 115, 120, 125 and 130. The memory 22 stores, among other things, the Initialization File 110 and User-Level Process List 135. A user interface 106 allows a user having root-level access to add and remove process entries to and from the User-Level Process List 135. The user interface 106 may also allow a user, having user-level access, to control execution of processes, for which the user has been afforded process control privileges.

An exemplary initialization file for a Unix System, inittab, has the format id:runlevels:action:process, where id is a unique sequence of 1-4 characters which identifies an entry, runlevels lists the runlevels for which the specified action should be taken, action describes which action should be taken, and process specifies the process to be executed. The following is an example inittab file for a Linux system:

```
# inittab for Linux
id:1:initdefault:
rc::bootwait:/etc/rc
1:1:respawn:/etc/getty 9600 tty1
2:1:respawn:/etc/getty 9600 tty2
3:1:respawn:/etc/getty 9600 tty3
4:1:respawn:/etc/getty 9600 tty4
```

In various embodiments and contrasting to the initialization file described above, Initialization File 110 may include instructions for the operating system including, but not limited to an identification of: process(es) to start, restart, or terminate during initialization (or restart) of the operating system, process(es) to start during normal operation of the operating system, process(es) to restart upon a particular event (such as termination of the process(es)), process(es) to shut down during an operating system shut down or re-boot, and the particular operating system configuration (e.g. particular operating system run level(s) in Operations Systems) in which a process should start (or restart). The Initialization File 110 may also store process identifiers and user IDs of users having privileges associated with the processes. The Initialization File 110 also stores the privileges afforded to each user ID. Sets of privileges are associated with each level of access given to a user. Alternatively, the Initialization File 110 may include a portion or all of the instructions associated with some or all of the processes identified by the Initialization File 110.

Upon initialization (or restart) of the operating system, Initialization Module 115 starts the User-Level Process Monitor Module 130. The User-Level Process Monitor Module 130 may be implemented as a script with a running loop that continuously checks and executes instructions in the User-Level Process List 135.

A Unix or Solaris crontab file which has five fields for specifying day of week (0-6), month (1-12), day of month (1-31), hour (0-23), and minute (0-59) followed by the command to be run at that interval. A "*" in any of the fields means all legal values. The value column in a crontab file can have a * or a list of elements separated by commas. An element is either a number in the ranges shown above or two numbers in the range separated by a hyphen (meaning an inclusive range). An example crontab file follows in which the tmp files are removed from /home/someuser/tmp each day at 6:30 PM.

30 18 * * * rm /home/someuser/tmp/*

In contrast to the Unix/Solaris crontab file which instructs a computer which processes are to be run and at what intervals, the User-Level Process List 135 may include instructions to the operating system such as what process(es) should be running per a prior request of a user, the name of the user that submitted the request, any parameters to apply when starting (or restarting) a process, indicators for which processes should shut-down during an operating system shut down or re-boot, and the like. Users with root-level access also have an ability to modify what information may be included in the User-Level Process List 135.

The User-Level Process List 135 may be updated through an Add User-Level Process Module 120, a Remove User-Level Process Module 125, or a Modify User-Level Process Module 127. The User-Level Process Module 120 permits an authorized user 105 with root-level access to add processes to the User-Level Process List 135 for one or more user-level users, where the added processes will be monitored by User-Level Process Monitor Module 130. The Remove User-Level Process Module 120 permits an authorized user 105 to remove processes from the User-Level Process List 135 and as a result disabling the monitoring of those processes by the User-Level Process Monitor Module 130. The Modify User-Level Process Module 127 permits an authorized user 105 to modify processes on the User-Level Process List 135 and as a result modify the behavior of the system with respect to that process during system start-up, shut-down, or process termination.

In the exemplary embodiment, the creation and updating of File 110, Modules 115-130 and List 135 (grouped in Section 145) are performed by a user with root-level access to the operating system. As a user with root-level access creates and/or updates section 145, the user with root-level access can determine, based on for example an application and/or a particular user's needs, the amount of control to give to a particular user to add or remove certain processes. For example, in creating or updating section 145, a user with root-level access can add or remove all processes, a sub-set of the processes or give these privileges to only certain users. By giving control of the creation and/or updates to section 145 to a user with root-level access, security is maintained in the manipulation of the processes.

FIGS. 2-5 are flow diagrams for processes carried out by exemplary embodiments. Operations illustrated in the flow diagrams may be performed in an order other than that which is described. Furthermore, it should be appreciated that not all of the operations illustrated in the flow diagrams are required to be performed, that additional operations may be added, and that some of the operations may be substituted with other operations.

Figure 2:
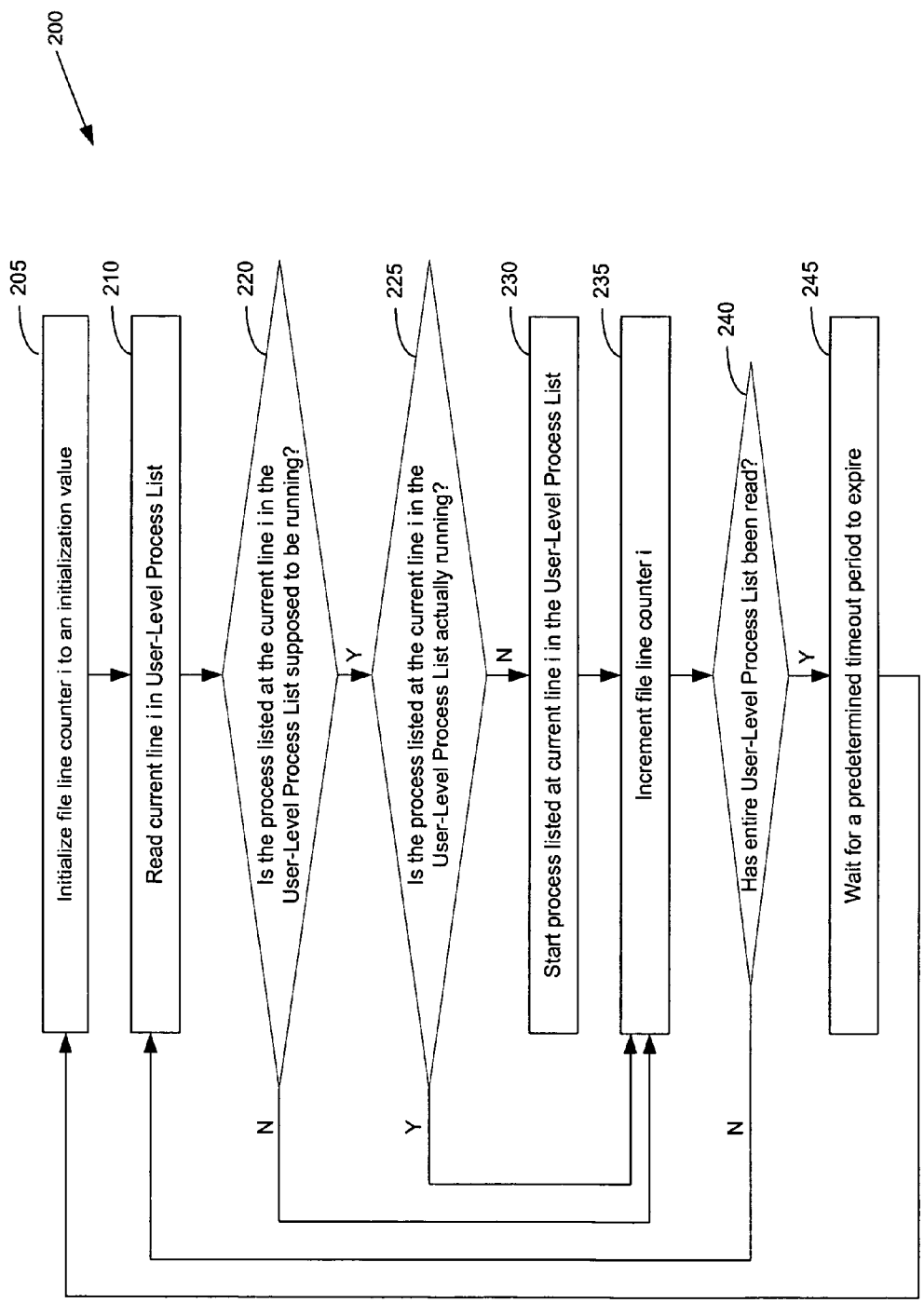
FIG. 2 is a flow diagram for user-level process monitoring in accordance with one embodiment.

FIG. 2 is a flow diagram for a method flow 200 for an exemplary embodiment of the User-Level Process Monitor 130 (shown in FIG. 1b). Method flow 200 can be invoked through an initialization module (such as Initialization Module 115 shown in FIG. 1b) or upon a certain event (such as the termination of a process). At block 205, a file line counter i is initialized to an initialization value. At block 210, the current line i in the User-Level Process List 135 is read. At block 220, the process or module 102 determines whether the process listed at current line i in the User-Level Process List 135 is running. This can be done for example by evaluating the instruction at current line i in the User-Level Process List 135 or by looking up this information in a file storing this information. If the process is supposed to be running, flow moves to block 225. If the process is not supposed to be running, flow moves to block is 235.

At block 225, the process module 102 determines whether the process listed at current line i in the User-Level Process List 135 is actually running. If the process is actually running, flow moves to block 235. If the process is not actually running, flow moves to block 230. At block 230, the process listed at current line i in the User-Level Process List 135 is started. In starting the process, instructions at current line i in the User-Level Process List 135 can be used. For example, a process that is started may be associated with the name or ID of the user listed in the instructions at current line i in the User-Level Process List 135. In Unix Systems, to do this, the "su" mechanism can be used. The "su" mechanism is a command to run a shell with substitute user and group identifiers and has the format su [OPTION] . . . [-] [USER [ARG] . . . ]. Another example is that a process may be started when the operating system is in a particular configuration (e.g. particular operating system run level(s) in Unix Systems).

At block 235, file line counter i is incremented. At block 240, the process or module 102 checks whether the entire User-Level Process List 135 has been read. If the entire User-Level Process List 135 has been read, flow moves to block 245. If the entire User-Level Process List 135 has not been read, flow moves to block 210. At block 245, a predetermined timeout period is run until it expires. The length of the timeout period can be predetermined based on a particular application's requirements. Thereafter, flow returns to block 205.

Figure 3:
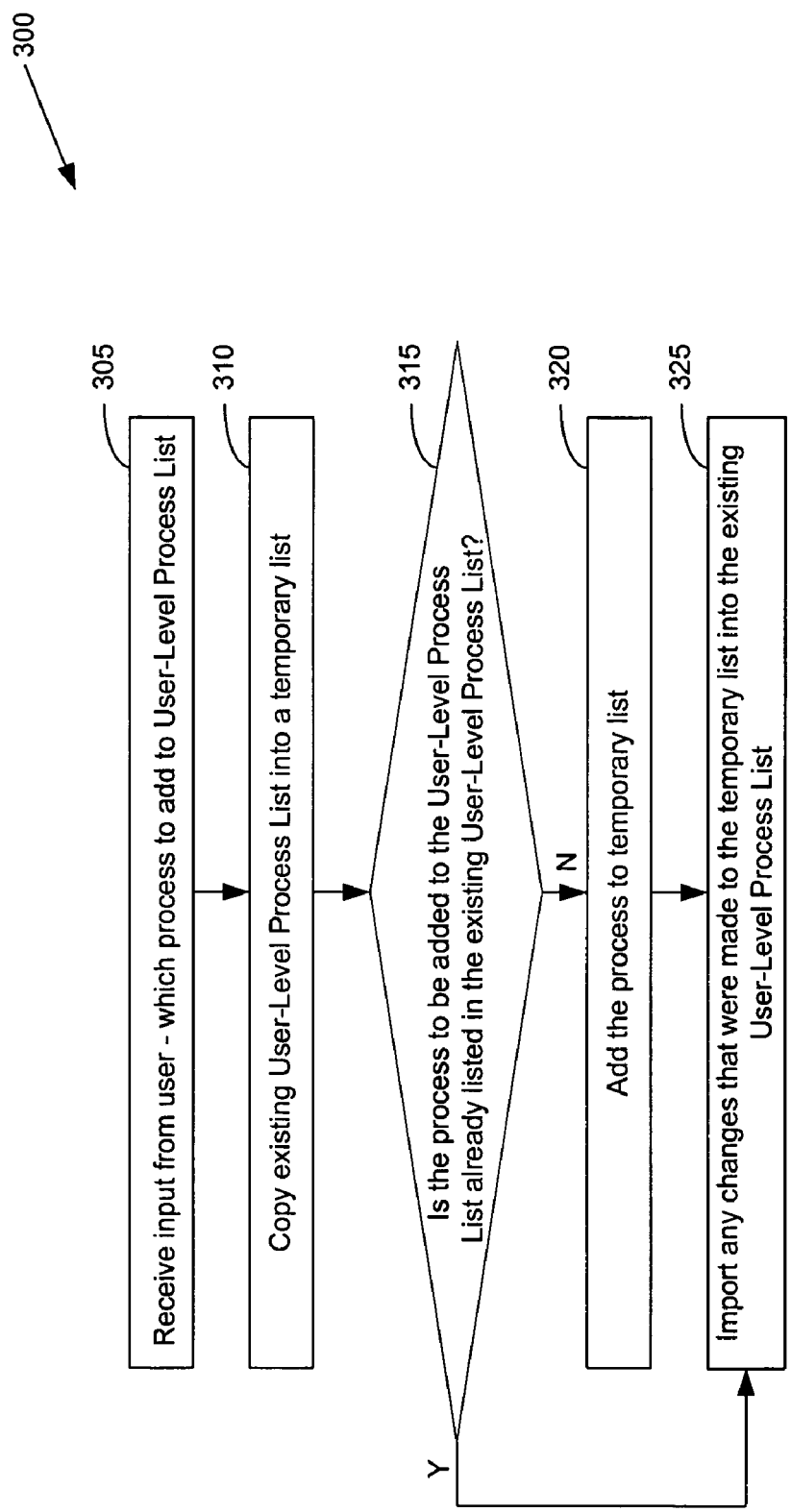
FIG. 3 is a flow diagram for adding a user-level process to the user-level process list in accordance with one embodiment.

FIG. 3 is a flow diagram for a method flow 300 for an exemplary embodiment of Add User-Level Process Module 120 (shown in FIG. 1b). At block 305, the process or module 102 receives an input from a user to add a process to the User-Level Process List 135 through user interface 106. The input may include user specified parameters, such as the particular configuration of the operating system (e.g. particular operating system run level(s) in Unix Systems), under which the process should be run. At block 310, the existing User-Level Process List 135 is copied into a temporary list. At block 315, the existing User-Level Process List 135 is checked to determine if the process to be added is already included in the existing User-Level Process List 135. If the process to be added is already included in the existing User-Level Process List 135, flow moves to block 325. If the process to be added is not already included in the existing User-Level Process List 135, flow moves to block 320.

At block 320, the process is added to the temporary list. At block 325, any changes that were made to the temporary list are imported to the existing User-Level Process List 135.

Figure 4:
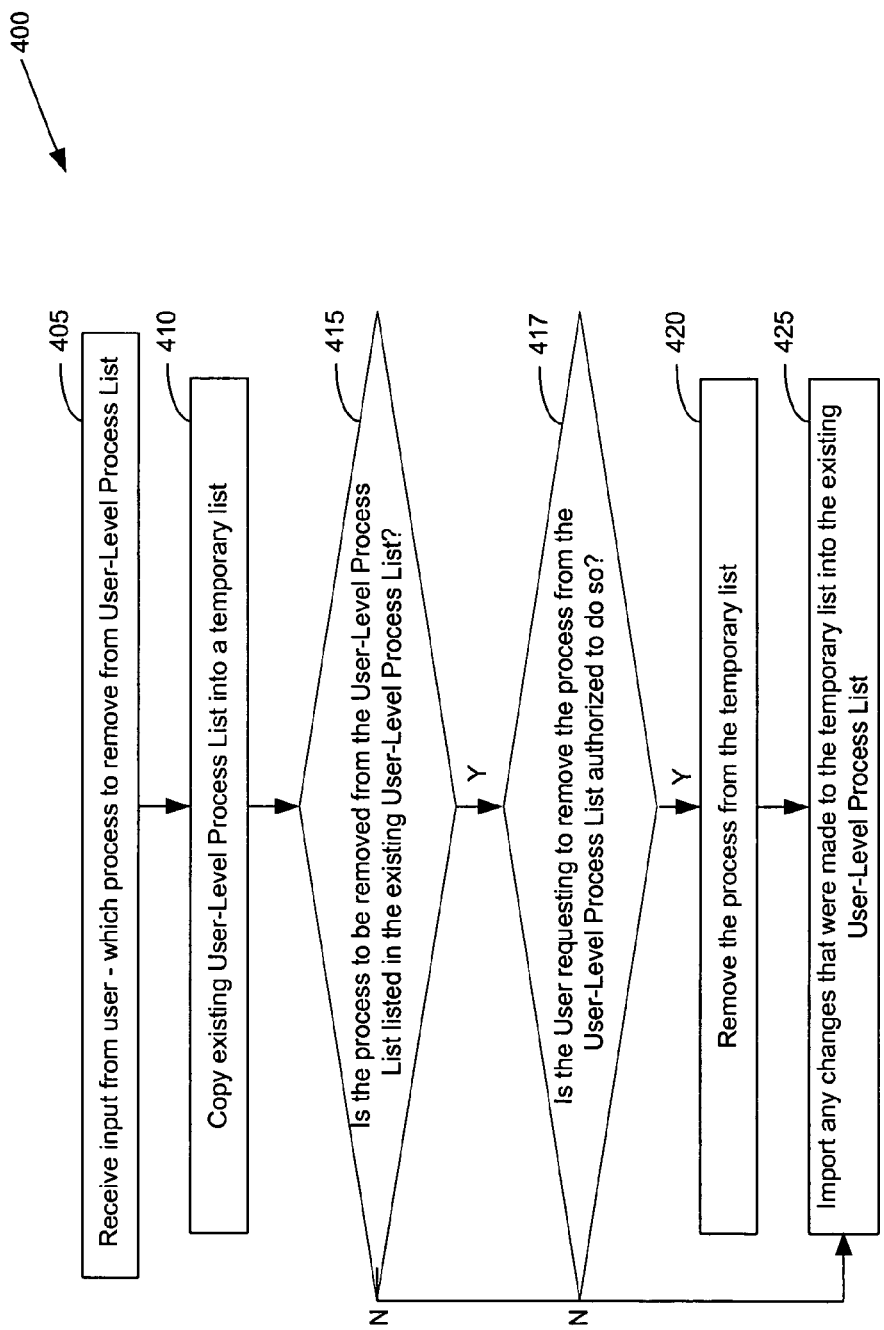
FIG. 4 is a flow diagram for removing a user-level process from the user-level process list in accordance with one embodiment.

FIG. 4 is a flow diagram for a method flow 400 for an exemplary embodiment of Remove User-Level Process Module 125 (shown in FIG. 1b). At block 405, the process or module 102 receives an input from a user to remove a process from the User-Level Process List 135 through the user interface 106. At block 410, the existing User-Level Process List is copied into a temporary list. At block 415, the existing User-Level Process List 135 is checked to determine if the process to be removed is included in the existing User-Level Process List 135. If the process is not included in the existing User-Level Process List 135, flow moves to block 425. If the process is included in the existing User-Level Process List 135, flow moves to block 417. At block 417, the existing User-Level Process List 135 is checked to determine if the user requesting to remove the process from the User-Level Process List 135 is authorized to do so. If the user is not authorized to remove the process, flow moves to block 425. If the user is authorized to remove the process, flow moves to block 420. At block 420, the process is removed from the temporary list. At block 425, any changes that were made to the temporary list are imported to the existing User-Level Process List 135.

Figure 5:
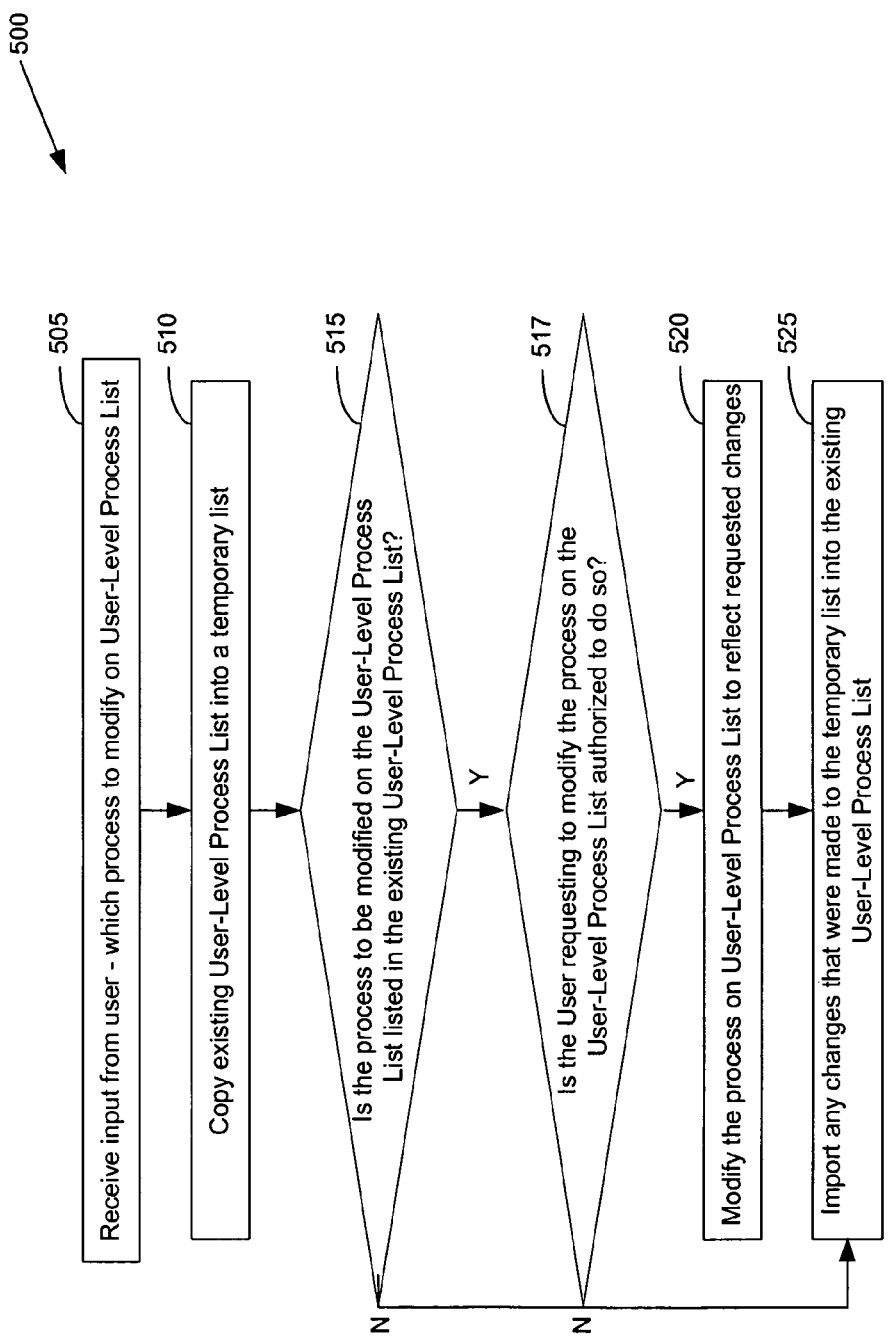
FIG. 5 is a flow diagram for modifying a user-level process within the user-level process list in accordance with one embodiment.

FIG. 5 is a flow diagram for a method flow 500 for an exemplary embodiment of Modify User-Level Process Module 127 (shown in FIG. 1b). At block 505, the process or module 102 receives an input from a user to modify a process on the User-Level Process List 135 through the user interface 106. At block 510, the existing User-Level Process List is copied into a temporary list. At block 515, the existing User-Level Process List 135 is checked to determine if the process to be modified is included on the existing User-Level Process List 135. If the process to be modified is not included on the existing User-Level Process List 135, flow moves to block 525. If the process to be modified is included on the existing User-Level Process List 135, flow moves to block 510. At block 517, the existing User-Level Process List 135 is checked to determine if the user requesting to modify the process on the User-Level Process List 135 is authorized to do so. If the user requesting to modify the process is not authorized to do so, flow moves to block 425. If the user requesting to modify the process is authorized to do so, flow moves to block 420. At block 420, the process in the temporary list is modified to reflect the requested changes. At block 425, any changes that were made to the temporary list are imported to the existing User-Level Process List 135.

FIG. 6 is an example initialization file for utilization with system 10 where the parameter <psmon> represents the full pathname of the monitoring process or program and the parameter <start exec> represents the full pathname of the program (with parameters) to be run when the process is started. The parameter <stop exec> represents the full pathname of the program (with parameters) to be run when the process is terminated, while the parameter <control file> represents the full pathname of the file used by the user level process monitor. In one embodiment, the parameter <control file> is used to allow a process to be monitored for automatic restart, but shut down for maintenance. The parameter <start time> is the number of seconds that the process will be given to complete its start-up (before starting next process), while the parameter <stop time> is the number of seconds that the process will be given to complete its shut-down (before stopping the next process). The parameter <run level> represents the operating system run-level at which the process should be started and shut down. The parameter <user> represents the user id (name) of the owner of the process and <options> is the indicator of whether the process should be started at boot, monitored (and restarted) during stable execution, and/or terminated on system shut-down.

FIG. 7 is an example process list for incorporation into system 10 where for a user, one process is provided with root-level access and another process is provided with user-level access. The process list is taken from the Unix command "ps-cf", where UID represents the name associated with the user who owns the process, PID represents a numeric process identifier, and PPID represents the numeric process identifier of the parent process which launched this process. The parameter CLS is the scheduling class for the process, while the parameter PRI represents the priority of the process. The parameter STIME represents the time (or date) at which the process was started. The parameter TTY is the terminal from which the process was started and the parameter TIME is the amount of processor time this process has consumed. The parameter CMD is the command name, with arguments, in one embodiment, up to a limit of 80 characters.

In the foregoing description, the description is with reference to specific example embodiments thereof. It will, however, be evident that various modifications and changes may be made thereto, without departing from the broader spirit and scope of the present invention. For example, embodiments may be provided as a computer program product, or software, that may include a machine-readable medium having stored thereon instructions. Further, a machine-readable medium may be used to program a computer system or other electronic device and the readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. The specification and drawings are accordingly to be regarded in an illustrative rather than in a restrictive sense.

While the invention has been described in terms of various specific embodiments, those skilled in the art will recognize that the invention can be practiced with modification within the spirit and scope of the claims.

What is claimed is:

1. A method for managing control over process execution by an operating system, the method comprising:
    defining first and second user levels of access to the operating system, the first user level having more privileges than the second user level;
    storing a process initialization file in a computer memory device, the process initialization file identifying processes, for which process execution is controlled by users having only the second user level of access to the system;
    preparing a process list, identifying each user having the second user level of access that affords the user control over execution of the identified processes; and
    monitoring execution of the identified processes based on the process list for each user having the second level of access, wherein monitoring includes starting a user-level process monitor upon initialization or restarting of the operating system.

2. A method according to claim 1 wherein the process initialization file comprises at least one of the following:
    i) processes to start during an initialization of the operating system;
    ii) processes to start during normal operation of the operating system;
    iii) processes to restart upon occurrence of a particular event;
    iv) processes to shut down during a shut down or re-booting of the operating system; and v) a particular operating system configuration in which a process should start.

3. A method according to claim 1 wherein the process list comprises instructions informing the operating system of processes that should be running based on at least one of the following:
   i) a prior request of a user,
   ii) a name of the user that submitted a request, and
   iii) any parameters to apply when starting corresponding processes.

4. A method according to claim 1 wherein monitoring execution of the processes includes starting a user-level process monitor that constitutes a script with a running loop that continuously checks and executes instructions in the process list.

5. A method according to claim 1 further comprising allowing a user with the first level of access to add processes to the process list, modify processes on the process list, and remove processes from the process list, on a user by user basis for users having a second level of access.

6. A method according to claim 1 wherein the monitoring execution of the processes based on the process list comprises:
   accessing an entry in the process list associated with a first process; and
   determining a state of the first process associated with the entry in the process list.

7. A method according to claim 1 wherein the monitoring execution of the processes based on the process list comprises:
   initializing a counter;
   accessing an entry in the process list corresponding to the counter; and
   determining a state of a process represented by the counter.

8. A method according to claim 1 further comprising:
   determining when all entries in the process list have been accessed.

9. A method according to claim 1 wherein the monitoring execution of the processes based on the process list comprises:
   accessing an entry in the process list associated with a first process;
   determining whether the first process is running;
   determining whether the first process is supposed to be running; and
   adjusting execution of the first process based on determining operations.

10. A computer system for managing control over process execution by an operating system, comprising:
   memory storing a user-level process list and a process initialization file, the process initialization file being accessible by users of the system having a first level of access, and identifying processes for which process execution is controlled by users of the system having a different second level of access to the system, the processes being executed by an operating system;
   the user-level process list identifying processes and users with the second level of access having privileges to control execution of the corresponding process; and
   a user-level process monitor module that monitors execution of the identified processes based on the user-level process list, and starts a user-level process monitor upon initialization or restarting of the operating system.

11. A computer system according to claim 10 further comprising:
   an add user-level process module allowing a user with the first level of access to add processes from the user-level process list for individual users having a second level of system access.

12. A computer system according to claim 10, further comprising:
   a remove user-level process module allowing a user with the first level of system access to remove processes from the user-level process list for individual users having the second level of system access.

13. A computer system according to claim 10, further comprising:
   a modify user-level process module allowing a user with the first level of system access to modify processes previously added by the user.

14. A computer system according to claim 10 further comprising an add user-level process module accepting input from a user to add a process to the user-level process list including a particular configuration of the operating system under which the process should be run.

15. A computer system according to claim 10 further comprising an add user-level process module accepting input from a user to add a process to the user-level process list, the add user level process module determining if the process to be added is already included in the user-level process list.

16. A computer system according to claim 10 wherein the process initialization file comprises at least one of the following:
   i) processes to start during an initialization of an operating system;
   ii) processes to start during normal operation of the operating system;
   iii) processes to restart upon a particular event;
   iv) processes to shut down during a shut down or re-booting of the operating system; and
   v) a particular operating system configuration in which a process should be started.

17. A computer system according to claim 10 wherein the user-level process list comprises instructions to the operating system indicating which processes should be running based on at least one of the following:
   i) a prior request of a user,
   ii) a name of the user that submitted the request, and
   iii) any parameters to apply to individual processes upon starting.

18. A computer system according to claim 10 wherein the user-level process monitor comprises a script having a running loop that continuously checks and executes instructions in the user-level process list.

19. A computer system according to claim 10 wherein the user-level process monitor determines a state of the process represented by an entry in the user-level process list.

20. A computer system according to claim 10 wherein the user-level process monitor accesses an entry in the user-level process list and determines a state of a process represented by the entry.

21. A computer system according to claim 10 wherein an operating system for said computer system comprises one of a Unix operating system, a Solaris operating system, a Linux operating system, and a Unix-like operating system.

22. A computer system according to claim 10 wherein the user-level process monitor accesses an entry in the user-level process list representing one of the processes;
   determines when the process represented by the entry in the user-level process list is running;

determine when the process represented by the entry in the user-level process list is supposed to be running; and adjusts execution of the process represented by the entry in the user-level process list based on the results of the determinations.

23. A computer program product for, managing control over processes to be executed by an operating system, the product disposed on a non-transitory computer-readable storage medium and comprising instructions for causing a computer to:

store and execute a process initialization file, the process initialization file being accessible by users identified by the operating system as having a first level of access, the process initialization file identifying processes for which process execution is controlled by users identified by the operating system as having a second level of access, maintain a user-level process list that identifies users with the second level of access having privileges to control execution of the identified processes;

monitor execution of the processes based on the user-level process list; and starts a user-level process monitor upon initialization or restarting of the operating system.

* * * * *